United States Patent [19]
Fukuyama et al.

[11] Patent Number: 5,872,691
[45] Date of Patent: *Feb. 16, 1999

[54] THIN FILM MAGNETIC HEAD, MAGNETORESISTANCE EFFECT MAGNETIC HEAD AND COMPOSITE MAGNETIC HEAD

[75] Inventors: Munekatsu Fukuyama, Miyagi; Yasuo Sasaki; Yutaka Soda, both of Kanagawa; Koji Fukumoto, Miyagi; Tetsuo Sekiya, Kanagawa, all of Japan

[73] Assignee: Sony Corporation, Tokyo, Japan

[*] Notice: The term of this patent shall not extend beyond the expiration date of Pat. No. 5,822,159.

[21] Appl. No.: 987,652

[22] Filed: Dec. 9, 1997

Related U.S. Application Data

[62] Division of Ser. No. 833,186, Apr. 4, 1997, Pat. No. 5,822,159, which is a continuation of Ser. No. 598,739, Feb. 8, 1996, abandoned, which is a continuation-in-part of Ser. No. 274,323, Jul. 13, 1994, abandoned.

[30] Foreign Application Priority Data

Jul. 14, 1993 [JP] Japan .................................... 5-174014
Aug. 30, 1993 [JP] Japan .................................... 5-213963

[51] Int. Cl.⁶ ...................................................... G11B 5/39
[52] U.S. Cl. ............................................................ 360/113
[58] Field of Search ............................. 360/113; 324/252; 338/32 R

[56] References Cited

U.S. PATENT DOCUMENTS

| | | | |
|---|---|---|---|
| 4,195,323 | 3/1980 | Lee | 360/113 |
| 4,356,523 | 10/1982 | Yeh | 360/113 |
| 5,018,038 | 5/1991 | Nakanishi | 360/126 |
| 5,208,715 | 5/1993 | Mowry | 360/113 |
| 5,247,413 | 9/1993 | Shibata et al. | 360/113 |
| 5,260,653 | 11/1993 | Smith et al. | 324/252 |
| 5,311,385 | 5/1994 | Schwarz | 360/113 |

FOREIGN PATENT DOCUMENTS

| | | |
|---|---|---|
| 0 404 332 | 12/1990 | European Pat. Off. . |
| 0 463 753 | 1/1992 | European Pat. Off. . |
| 0 325 365 | 7/1995 | European Pat. Off. . |

(List continued on next page.)

OTHER PUBLICATIONS

Patent Abstracts of Japan, vol. 008, No. 010 (P–248), Jan. 18, 1984 & JP–A–58 171709 (Mitsubishi Denki KK), Oct. 8, 1983.
Patent Abstracts of Japan, vol. 017, No. 681 OP–1660), Dec. 14, 1993 & JP–A–05 225521 (Sony Corp.), Sep. 3, 1993 (full patent listed above as Item AO).

(List continued on next page.)

Primary Examiner—William J. Klimowicz
Attorney, Agent, or Firm—Hill & Simpson

[57] ABSTRACT

A thin-film magnetic head, a magnetoresistance effect magnetic head and an MR inductive head are disclosed. The thin-film magnetic head has one of thin-film magnetic cores stacked on a substrate and formed of two magnetic films and a non-magnetic film held between them, with a current flowing through the thin-film magnetic core in the direction of hard axis thereof. The magnetoresistance effect magnetic head has one of a pair of shield cores having a magnetoresistive element between them formed of two magnetic films and a non-magnetic film held between them, the magnetoresistive element being electrically connected to the shield core, with a sense current flowing through the shield core. The current flowing through the one shield core via the magnetoresistive element is preferably an AC of decrement amplitude for demagnetizing the shield core along with a DC sense current. Also, this current preferably flows in the direction of hard axis of the shield core so that magnetic properties of the shield core are stabilized or demagnetized by the magnetic field generated in the direction of easy axis. The MR inductive head has a second thin-film magnetic core as a common magnetic body of an MR head and an inductive head on one substrate, formed of two magnetic films and a non-magnetic film held between them, with a current flowing through the second thin-film magnetic core in the direction of hard axis thereof.

2 Claims, 11 Drawing Sheets

FOREIGN PATENT DOCUMENTS

| | | |
|---|---|---|
| 0 221 540 | 5/1998 | European Pat. Off. . |
| 53-39110 | 10/1978 | Japan . |
| 61-145718 | 7/1986 | Japan . |
| 61-253619 | 11/1986 | Japan . |
| 63-71915 | 4/1988 | Japan . |
| 63-244407 | 10/1988 | Japan . |
| 63-298705 | 3/1989 | Japan . |
| 4-26909 | 1/1992 | Japan . |
| 5-62131 | 3/1993 | Japan . |
| 5 225521 | 9/1993 | Japan . |
| 2 003 647 | 3/1979 | United Kingdom . |
| 2 268 617 | 1/1994 | United Kingdom . |
| WO-A-89 05505 | 6/1989 | WIPO . |

OTHER PUBLICATIONS

Patent Abstracts of Japan, vol. 013, No. 129)P–849), Mar. 30, 1989 & JP–A–63 298705 (Toshiba Corp., others: 01), Dec. 6, 1988 (full patent listed above as Item AP).

Patent Abstracts of Japan, vol. 016, No. 333 (P–1389), Jul. 20, 1992 & JP–A–04 098605 (Sony Corp.), Mach 31, 1992.

IBM Technical Disclosure Bulletin, Anonymous, *Magnetic Head Assembly With Mangetoresistance Sensor,* vol. 23, No. 10, Mar. 1981, New York, U.S., p. 4664.

Patent Abstracts of Japan, vol. 107, No. 454 (P–1596), Aug. 19, 1993 & JP–05–101342 A (Hitachi Ltd.), Apr. 23, 1993.

THIN FILM MAGNETIC HEAD, MAGNETORESISTANCE EFFECT MAGNETIC HEAD AND COMPOSITE MAGNETIC HEAD

This application is a division of U.S. application Ser. No. 08/833,186, now U.S. Pat. No. 5,822,159, filed Apr. 4, 1997, which is a continuation of U.S. application Ser. No. 08/598,739 filed Feb. 8, 1996, now abandoned, which is a continuation-in-part of U.S. Ser. No. 08/274,323 filed Jul. 13, 1994, now abandoned. The foregoing applications are incorporated herein by reference to the extent not already presented herein. The present and foregoing application claims priority to Japanese applications Nos. P05-174014 filed Jul. 14, 1993 and P05-213963 filed Aug. 30, 1993.

BACKGROUND OF THE INVENTION

This invention relates to a thin-film magnetic head, a magnetoresistance effect magnetic head and a composite magnetic head which are suitably adapted for recording and reproducing information signals into and from, for example, a hard disk.

A magnetoresistance effect magnetic head, hereinafter referred to as an MR head, has its magnetic sensor formed of a magnetic thin film having magnetoresistance effect. Since resistivity of the magnetic thin film is changed in accordance with a signal magnetic field based on magnetic recording into a magnetic recording medium, the magnetic sensor detects the change in resistivity as a reproduction output voltage from a sense current flowing through the magnetic thin film.

Such an MR head has characteristics, such as, high output, low crosstalk and velocity-independence, and is therefore used as a reproducing head for a hard disk drive (HDD) or as a high density recording/reproducing head for a digital audio tape recorder.

Figure 1:
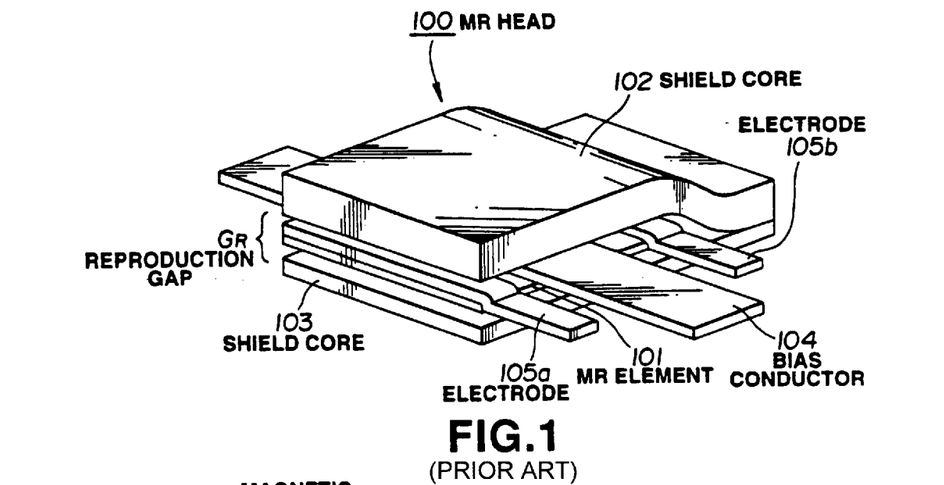
FIG. 1 is a schematic perspective view showing the structure of a conventional shield MR head.

This MR head is exemplified by an MR head of shield structure as shown in FIG. 1.

The shield MR head 100 of FIG. 1 has an MR element 101, which is formed of a single-layer or multi-layer magnetic thin film having magnetoresistance effect and is arranged in a space forming a predetermined reproduction gap $G_R$ between an upper (layer) shield core 102 and a lower (layer) shield core 103. The MR element 101 is electrically connected with a pair of electrodes 105a, 105b for causing a direct current as the sense current to flow and for outputting the change in resistivity as a change in voltage.

Between the electrodes 105a, 105b, a bias conductor 104 for applying a bias magnetic field to the MR element 101 is provided, traversing the MR element 101. For the shield cores 102, 103 of the shield MR head 100, a single bulk magnetic body, a single-layer plating film or a single-layer sputtered film is used.

Figure 2:
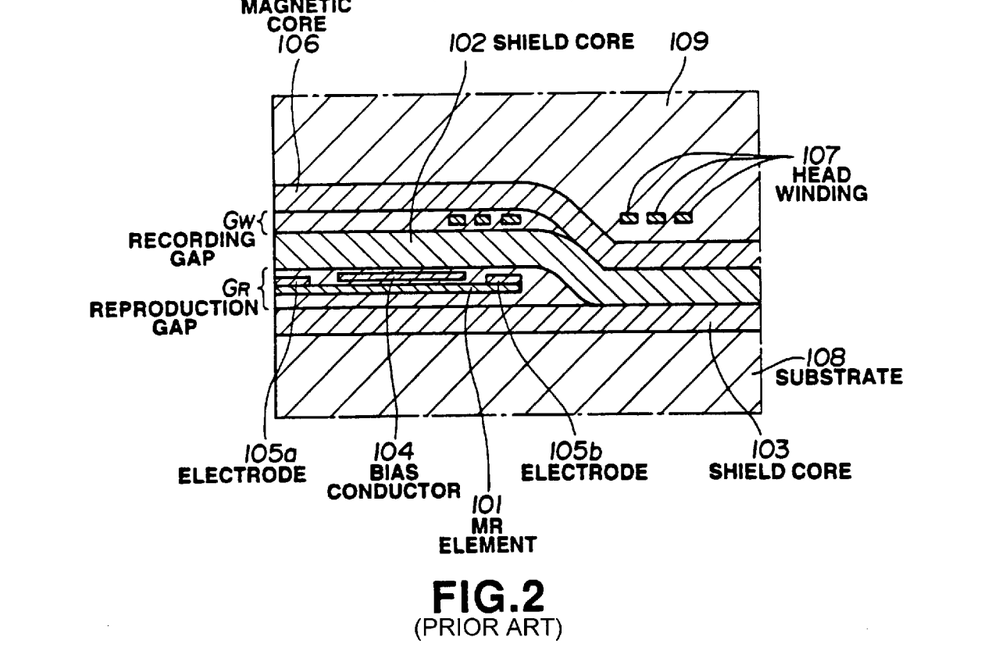
FIG. 2 is a schematic cross-sectional view showing the structure of a conventional MR inductive head.

An example of a composite magnetic head, produced by combining an MR head with a recording head formed of an inductive thin-film magnetic head, is shown in FIG. 2. The inductive thin-film magnetic head and the composite magnetic head are hereinafter referred to as an inductive head and an MR inductive head, respectively. Since the MR head in this case has the structure similar to that of the example in FIG. 1, the corresponding parts are denoted by the same reference numerals and will not be explained further.

In FIG. 2, a magnetic core 106 is provided on the upper shield core 102 of the MR head with a predetermined recording gap $G_W$ between them, and a spiral head winding 107 is provided, surrounding a magnetically connecting part as a connecting portion of the magnetic core 106 with the shield core 102.

In the MR inductive head of this structure, the lower shield core 103 is provided on a base or substrate 108 of $Al_2O_3$—TiC, and a protection film layer 109 is stacked on the magnetic core 106, with a non-magnetic insulation material charged or stacked between the gaps. The end surface of the MR inductive head having the reproduction gap $G_R$ and the recording gap $G_W$ formed therein serves as an air bearing surface (ABS), that is, a surface facing the magnetic recording medium, such as a hard disk.

Meanwhile, the magnetic core 106 and the shield cores 102, 103 are normally provided with anisotropy in a particular direction, that is, the direction of track width, in the production process. However, it is difficult to provide anisotropy on the entire film of the magnetic core 106 and the shield cores 102, 103, and dispersion of anisotropy usually remains in a microscopic sense. Such dispersion of anisotropy is a cause of a noise generated by fluctuation in output and shifting of magnetic domain walls, that is, a so-called Barkhausen noise. Also, the magnetic ununiformity causes fluctuation at the time when the magnetic field is externally added, resulting in fluctuation of reproduction output after recording.

If a two-gap recording/reproducing head is employed in which the inductive head is superposed on the MR head, or if a one-gap recording/reproducing head is employed in which the magnetic core of the inductive head serves also as the shield core of the MR head, a large magnetic field is applied from a recording head section to the shield core on recording. For this reason, a magnetic domain of the shield core may remain turbulent when the operation has been switched from recording to reproduction. Since the shield core forms part of a magnetic path of the magnetic field from the magnetic medium, there is a high possibility that the turbulence of the magnetic domain of the shield core causes the Barkhausen noise to be generated. In addition, since the shield core forms part of a magnetic path of the magnetic bias, the state of bias becomes unstable, causing the reproduction signal waveform to be unstable.

The JP Patent Kokai Publication No. 5-62131, for example, discloses a technique of maintaining a reproduction output at a constant level by splitting the thin-film magnetic core into two films with the non-magnetic layer between them and then reducing the leakage magnetic field from the thin-film magnetic core to the MR element. Also, attempts to restrict changes in the magnetic domain due to the recording magnetic field have been made with the use of a shield core formed of a magnetic film of two layers or more which is separated with the non-magnetic film and stacked. However, it is difficult to perfectly stabilize the magnetic domain and to have a perfectly single magnetic domain for stabilizing reproduction signals.

Meanwhile, it has been known that the Barkhausen noise can be reduced by applying the magnetic field in the direction of the easy axis. Thus, a technique of causing a current to flow through the two-layer shield core to stabilize the reproduction output has been conceived. However, even with this technique, it may be impossible to perfectly adjust the magnetic domain which has become turbulent on recording, particularly in the MR inductive head.

SUMMARY OF THE INVENTION

In view of the above-described status of the art, it is an object of the present invention to provide a thin-film magnetic head, a magnetoresistance effect magnetic head and an MR inductive head, which have magnetic domains of thin-film magnetic core and the shield core stabilized or demagnetized and have head outputs improved while having relatively simple structure.

According to the present invention, there is provided a thin-film magnetic head having one of thin-film magnetic cores stacked on a substrate and formed of two magnetic films and a non-magnetic film held between them, with a current being caused to flow through the thin-film magnetic core in the direction of hard axis thereof.

According to the present invention, there is also provided a magnetoresistance effect magnetic head having one of a pair of shield cores having a magnetoresistive element between them formed of two magnetic films and a non-magnetic film held between them, the magnetoresistive element being electrically connected to the shield core, with a sense current being caused to flow through the shield core.

In this case, the current flowing through the one shield core via the magnetoresistive element may be preferably an AC of decrement amplitude for demagnetizing the shield core along with a DC sense current. It is also preferred that this current flows in the direction of hard axis of the shield core so that magnetic properties of the shield core are stabilized or demagnetized by the magnetic field generated in the direction of easy axis.

According to the present invention, there is also provided an MR inductive head having a second thin-film magnetic core used as a common magnetic body of an MR head and an inductive head on one substrate and formed of two magnetic films and a non-magnetic film held between them, with a current being caused to flow through the second thin-film magnetic core in the direction of hard axis thereof.

In the thin-film magnetic head according to the present invention, as the current flows through the thin-film magnetic core in the direction of hard axis thereof, the current generates a magnetic field in the direction of easy axis, and this magnetic field adjusts the magnetic domain of the thin-film magnetic core into the direction of easy axis, thus stabilizing the magnetic domain.

In the MR head according to the present invention, as the shield core is electrically connected to the MR element so that the sense current flows through the shield core via the MR element, the current generates a magnetic field in the direction of easy axis, and this magnetic field adjusts the magnetic domain of the thin-film magnetic core into the direction of easy axis, thus stabilizing the magnetic domain.

In the MR inductive head according to the present invention, as the current flows through the second thin-film magnetic core as the common magnetic body of the MR head and the inductive head in the direction of hard axis of the thin-film magnetic core, the current generates a magnetic field in the direction of easy axis, and this magnetic field adjusts the magnetic domain of the thin-film magnetic core into the direction of easy axis, thus stabilizing the magnetic domain. Accordingly, the magnetic domain which has become turbulent after recording with the inductive head can be stabilized by the magnetic field generated by the current flowing through the second thin-film magnetic core. As a result, fluctuation in output and generation of the Barkhausen noise can be significantly reduced.

BRIEF DESCRIPTION OF THE DRAWINGS

FIGS. 12A through 12D are waveform diagrams for explaining an example of a current supplies to an MR head of the MR inductive head of Embodiment 3.

DETAILED DESCRIPTION OF THE PREFERRED EMBODIMENTS

Preferred embodiments of the present invention will now be described in detail with reference to the accompanying drawings.

Embodiment 1

In Embodiment 1, the present invention is applied to a thin-film magnetic head for recording/reproduction.

Figure 3:
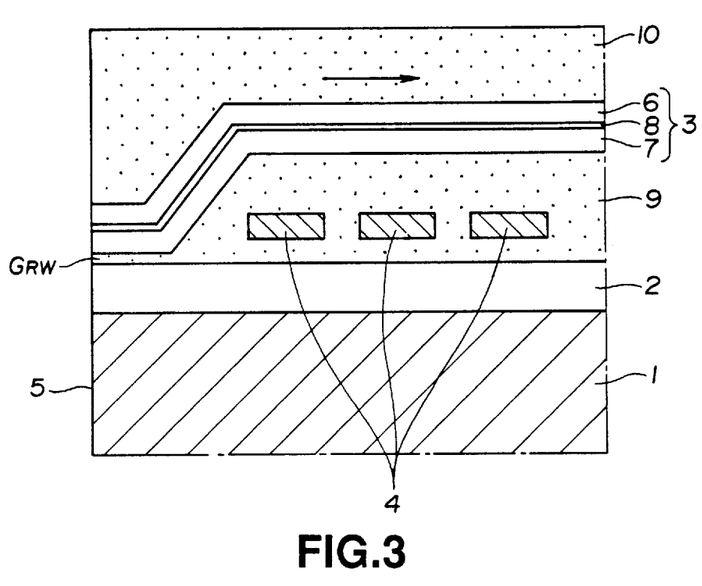
FIG. 3 is an enlarged cross-sectional view showing essential portions of a thin-film magnetic head of Embodiment 1.

The thin-film magnetic head includes a pair of thin-film magnetic cores 2, 3 stacked on a substrate 1 of, for example, $Al_2O_3$—TiC, and a magnetic gap $G_{RW}$ serving as a recording/reproduction gap formed between forward ends of the thin-film magnetic cores 2, 3, as shown in FIG. 3.

A magnetic circuit section is constituted by the lower thin-film magnetic core 2 formed on the substrate 1, the upper thin-film magnetic core 3 formed on the lower thin-film magnetic core 2 with a predetermined distance therefrom, and a conductive coil 4 formed between these thin-film magnetic cores 2, 3.

The lower thin-film magnetic core 2 is formed across the portion from the side of an ABS surface 5 in which the magnetic gap $G_{RW}$ is presented to the back side, with one lateral edge exposed to the ABS surface 5.

The upper thin-film magnetic core 3 is also formed across the portion from the side of the ABS surface 5 to the back side, with one lateral edge exposed to the ABS surface 5. The upper thin-film magnetic core 3 is provided closely to the lower thin-film magnetic core 2 on the ABS surface, thus forming the magnetic gap $G_{RW}$ in the portion where the thin-film magnetic cores 3, 2 are close to each other. Also, the upper thin-film magnetic core 3 is inclined backward from the zero-depth position of the magnetic gap $G_{RW}$ in such a manner as to have an increasing distance from the lower thin-film magnetic core 2, and is caused to be in parallel to the lower thin-film magnetic core 2 from the intermediate portion. The upper thin-film magnetic core 3 is then caused to magnetically contact the lower thin-film magnetic core 2 on the back side.

The upper thin-film magnetic core 3 has a stacked structure constituted by two layers of magnetic films 6, 7 and a non-magnetic film 8 held between them.

The conductive coil 4 is formed in a spiral shape by sputtering a conductive metallic material, such as Cu or Al, and then etching the sputtered material. The conductive coil 4 is buried in an insulation layer 9 formed between the lower thin-film magnetic core 2 and the upper thin-film magnetic core 3, and is formed around the magnetically connecting portion of the lower and upper thin-film magnetic cores 2, 3.

For protecting the magnetic circuit section of the above structure, a protection film 10 of, for example, $Al_2O_3$ is formed on the upper thin-film magnetic core 3.

A ferromagnetic material having high saturation magnetic flux density and satisfactory soft magnetic property is used for the lower thin-film magnetic core 2 and the upper thin-film magnetic core 3. Any of conventionally known ferromagnetic materials can be used regardless of its being crystalline or amorphous.

For example, ferromagnetic materials, such as, Fe—Al—Si based alloy, Fe—Al based alloy, Fe—Si—Co based alloy, Fe—Ni based alloy, Fe—Si—Co based alloy, Fe—Al—Ge based alloy, Fe—Ga—Ge based alloy, Fe—Si—Ge based alloy and Fe—Co—Si—Al based alloy, or Fe—Ga—Si based alloy may be used. In addition, in order to further improve corrosion resistance and abrasion resistance of the Fe—Ga—Si based alloy, an alloy having a fundamental composition consisting of Fe, Ga, Co (including Co partly replacing Fe) to which at least one of Ti, Cr, Mn, Zr, Nb, Mo, Ta, W, Ru, Os, Rh, Ir, Re, Ni, Pb, Pt, Hf and V is added may be used.

Also, a ferromagnetic amorphous metal alloy or a so-called amorphous alloy may be used, such as, an alloy composed of at least one or more elements of Fe, Ni and Co and at least one or more elements of P, C, B and Si, a metal-metalloid based amorphous alloy composed mainly of the above-mentioned alloy and containing Al, Ge, Be, Sn, In, Mo, W, Ti, Mn, Cr, Zr, Hf and Nb, and a metal-metal based amorphous alloy composed mainly of a transition metal element of Co, Hf or Zr, or a rare earth element.

As the film forming method for the thin-film magnetic cores 2, 3, the plating method or the vacuum thin film forming technique represented by the vacuum deposition method, the sputtering method, the ion plating method or the cluster ion beam method is employed.

Figure 4:
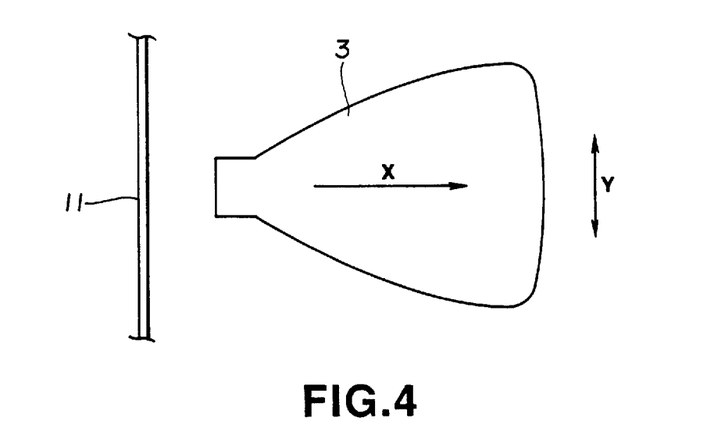
FIG. 4 is an enlarged plan view showing an upper layer thin-film magnetic core of the thin-film magnetic head of Embodiment 1.

Meanwhile, the lower thin-film magnetic core 2 and the upper thin-film magnetic core 3 are provided with anisotropy in the production process so that the easy axis is in the direction of track width, indicated by arrow Y in FIG. 4, in parallel to a magnetic recording medium 11. The anisotropy provided for the thin-film magnetic cores 2, 3, however, is not perfectly arranged in the direction of easy axis over the whole magnetic film, and usually remains dispersed. Since the dispersion of anisotropy causes fluctuation in output and the Barkhausen noise, a current is caused to flow in the direction of hard axis of the magnetic head of present invention, as indicated by arrow X in FIGS. 4 and 5.

Figure 5:
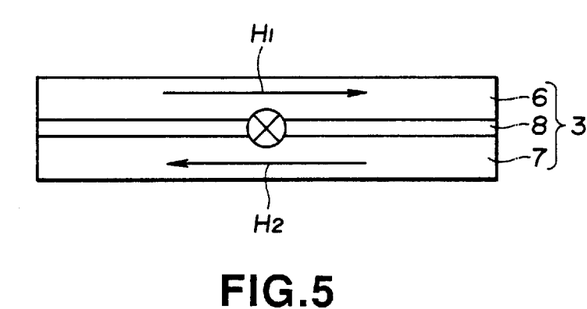
FIG. 5 is a schematic view showing a state of magnetic field generation at the time when a current in the direction of hard axis is caused to flow through the upper layer thin-film magnetic core of the thin-film magnetic head of Embodiment 1.

As the current flows in the direction of hard axis, magnetic fields $H_1$, $H_2$ are generated in the direction of easy axis Y in the upper thin-film magnetic core 3. As a result, the magnetic fields $H_1$, $H_2$ adjust the direction of magnetization of the thin-film magnetic core 3 into the direction of easy axis, thus stabilizing the magnetic domain. Particularly, when the pair of upper and lower magnetic films 6, 7 are stacked as in the upper thin-film magnetic core 3, the upper and lower magnetic films 6, 7 are desirably coupled with each other to form the structure of single magnetic domain, thus producing a highly stable state without having magnetic domain walls.

Consequently, in the thin-film magnetic head of the above structure, if the current in the direction of hard axis is caused to flow through at least one of the thin-film magnetic cores 2, 3 after recording, the turbulent magnetic domain due to the recording magnetic field can be adjusted and the fluctuation in output and generation of the Barkhausen noise can be restricted. Thus, it is possible to implement satisfactory recording/reproduction.

Embodiment 2

In Embodiment 2, the present invention is applied to an MR head for reproduction.

Figure 6:
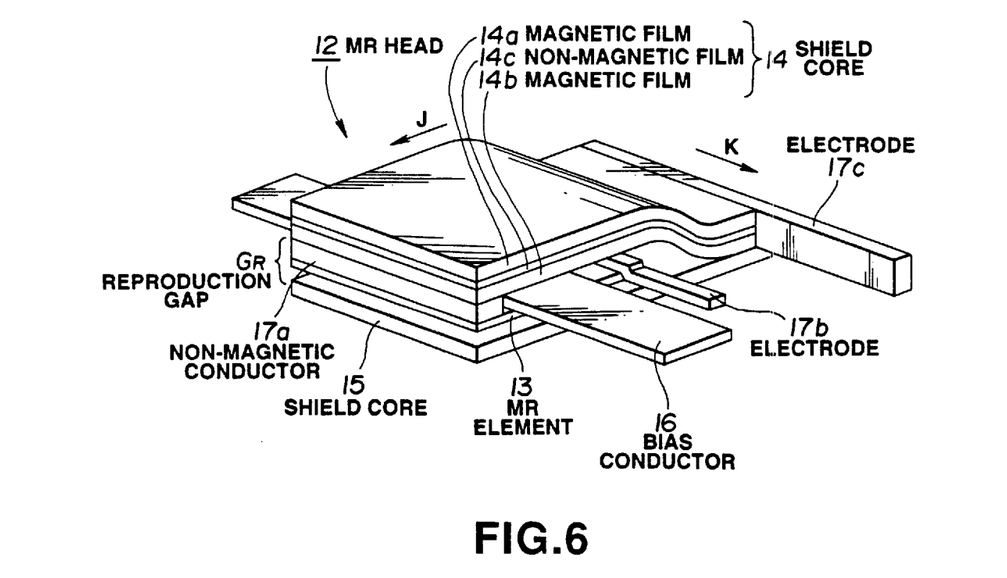
FIG. 6 is a schematic perspective view showing the structure of an MR head of Embodiment 2.

In an MR head 12 shown in FIG. 6, an MR element 13 as a magnetic sensor composed of a single-layer or multi-layer magnetic thin film having magnetoresistance effect is located in a space forming a predetermined reproduction gap $G_R$ provided between a pair of shield cores, that is, an upper shield core 14 and a lower shield core 15. In the space between these shield cores 14, 15, a bias conductor 16 is arranged traversing the MR element 13.

One of the shield cores, for example, the shield core 14, has its one end, on the side of the reproduction gap $G_R$, electrically connected to the MR element with a non-magnetic conductor 17a provided between them. The non-magnetic conductor 17a serves both as an electrode and as a gap film. The MR element 13 has its other end electrically connected to an electrode 17b, so as to be taken out to outside. The shield core 14 electrically connected to the MR element 13 has a structure in which two layers of soft magnetic thin films 14a, 14b separated with a non-magnetic thin film 14c between them are stacked. The shield core 14 has its other end electrically connected to an electrode 17c, so as to be taken out to outside.

Figure 7:
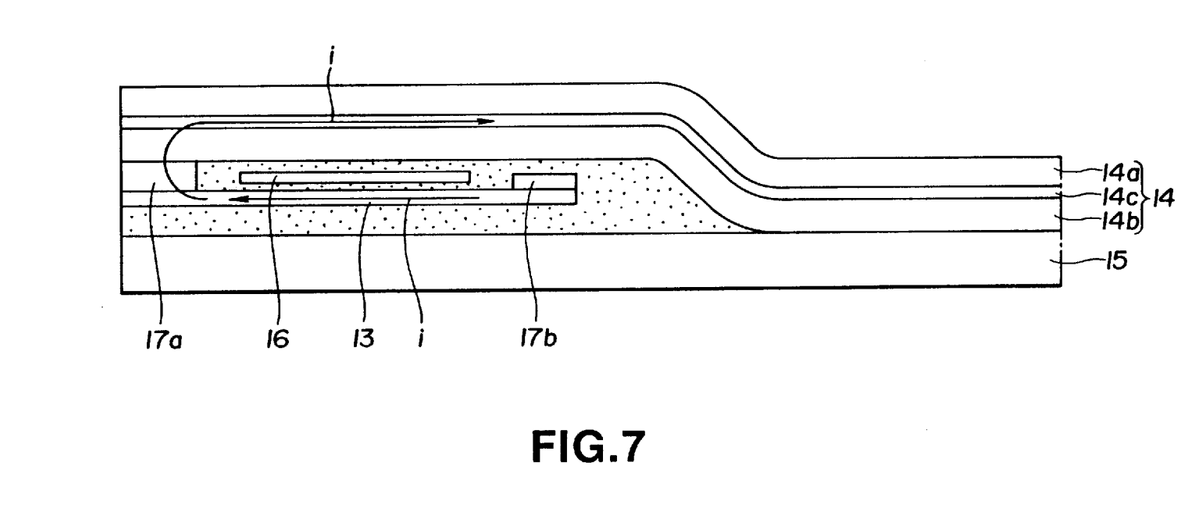
FIG. 7 is an enlarged cross-sectional view showing the MR head of Embodiment 2.

In the MR head as described above, a sense current i directed from the electrode 17b on the rear side to the non-magnetic conductor 17a is caused to flow through the MR element 13, as shown in FIG. 7. The sense current i flows through the MR element 13 and then through the non-magnetic conductor 17a on the front side thereof to the upper shield core 14. The current flowing through the shield core 14 is in the direction of hard axis.

Figure 8:
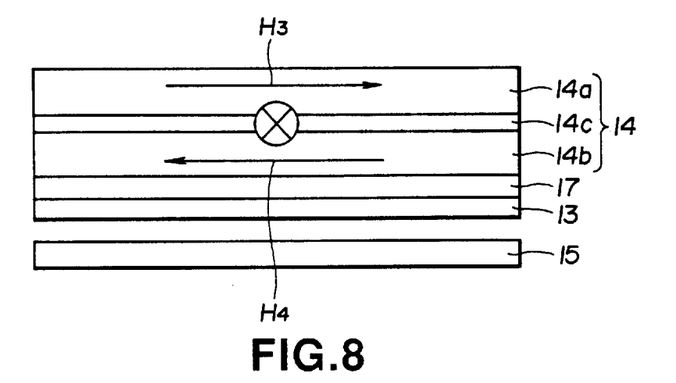
FIG. 8 is a schematic view showing a state of magnetic field generation at the time when a current in the direction of hard axis is caused to flow through a shield core of the MR head of Embodiment 2.

As the sense current i flows through the upper shield core 14, magnetic fields $H_3$, $H_4$ in the direction of easy axis, as indicated by an arrow in FIG. 8, are generated in the shield core 14. The magnetic fields $H_3$, $H_4$ adjust the direction of magnetization of the shield core 14 into the direction of easy axis, thus stabilizing the magnetic domain. Particularly, since the two layers of magnetic films 14a, 14b are stacked in the upper shield core 14, the upper and lower magnetic films 14a, 14b are desirably coupled with each other to form the structure of single magnetic domain, thus producing a highly stable state without having magnetic domain walls.

In this manner, in the MR head of the present embodiment, since the sense current i constantly flows through the shield core 14, the magnetic domain of the shield core is constantly stable, with fluctuation in output and generation of the Barkhausen noise being restricted. Thus, it is possible to implement satisfactory recording/reproduction.

Embodiment 3

In Embodiment 3, the present invention is applied to an MR inductive head of a magnetic disk device, such as, a hard disk.

Figure 9:
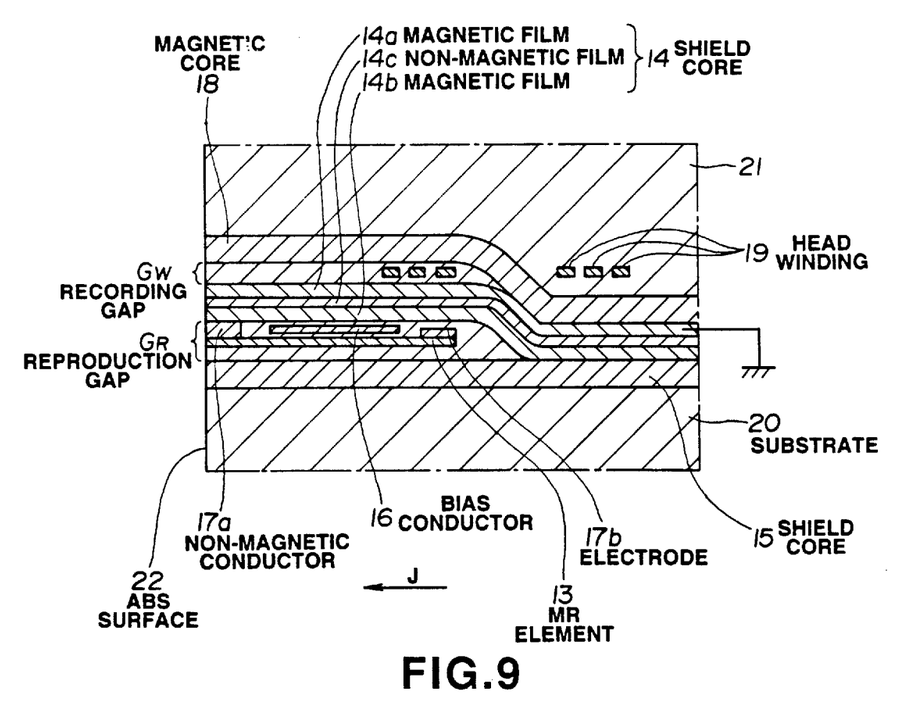
FIG. 9 is an enlarged cross-sectional view showing essential portions of an MR inductive head of Embodiment 3.

The MR inductive head is composed of the MR head 12 of Embodiment 2 and an inductive head stacked thereon, as shown in FIG. 9. That is, the upper magnetic film 14a of the shield core 14 of stacked structure is used as a recording core, and a magnetic core 18 is provided on the upper magnetic film 14a with the predetermined recording gap $G_W$ between them. A head winding 19 as a spiral conductive coil is provided around the magnetically connecting portion of the magnetic core 18 with the upper magnetic film 14a.

The MR inductive head is provided with the shield core 15 of the MR head on a base or substrate 20 of $Al_2O_3$—TiC, a protection film layer 20 stacked on the magnetic core 18, and a non-magnetic insulation material charged or stacked in the gap. The front end surface of the MR inductive head in which the reproduction gap $G_R$ and the recording gap $G_W$ are provided is a so-called air bearing surface (ABS) 22 as the surface facing a magnetic recording medium, such as, a hard disk. The shield core 14 in the intermediate position is grounded, for achieving a reduction of noise and prevention of electrostatic destruction.

Figure 10:
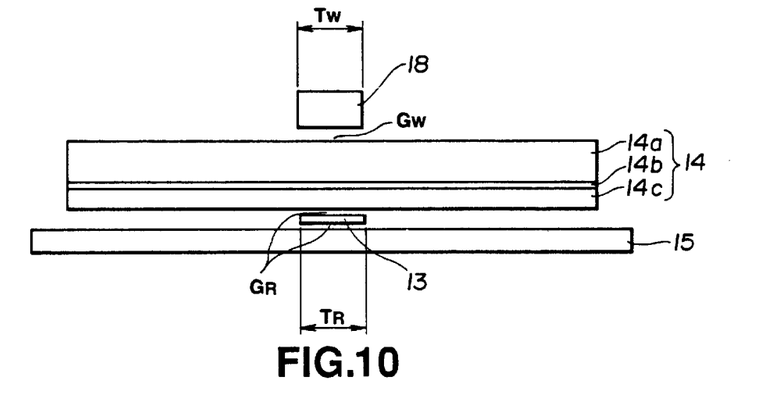
FIG. 10 is an enlarged front view showing the MR inductive head of Embodiment 3, as viewed from the ABS surface.

Meanwhile, the reproduction track width $T_R$ of the reproduction gap $G_R$ and the recording track width $T_W$ of the recording gap $G_W$ are in the relation shown in FIG. 10.

In the MR inductive head as described above, as recording has been carried out with the inductive head, residual magnetization remains in the shield core 14, causing the magnetic domain to be turbulent. However, since the sense current i flows in the direction of hard axis through the shield core 14, the magnetic fields $H_3$, $H_4$ generated by the sense current i stabilizes the magnetic domain after recording. Accordingly, even if the operation is switched from recording to reproduction, the stable magnetic domain prevents fluctuation in output and generation of the Barkhausen noise.

Figure 11:
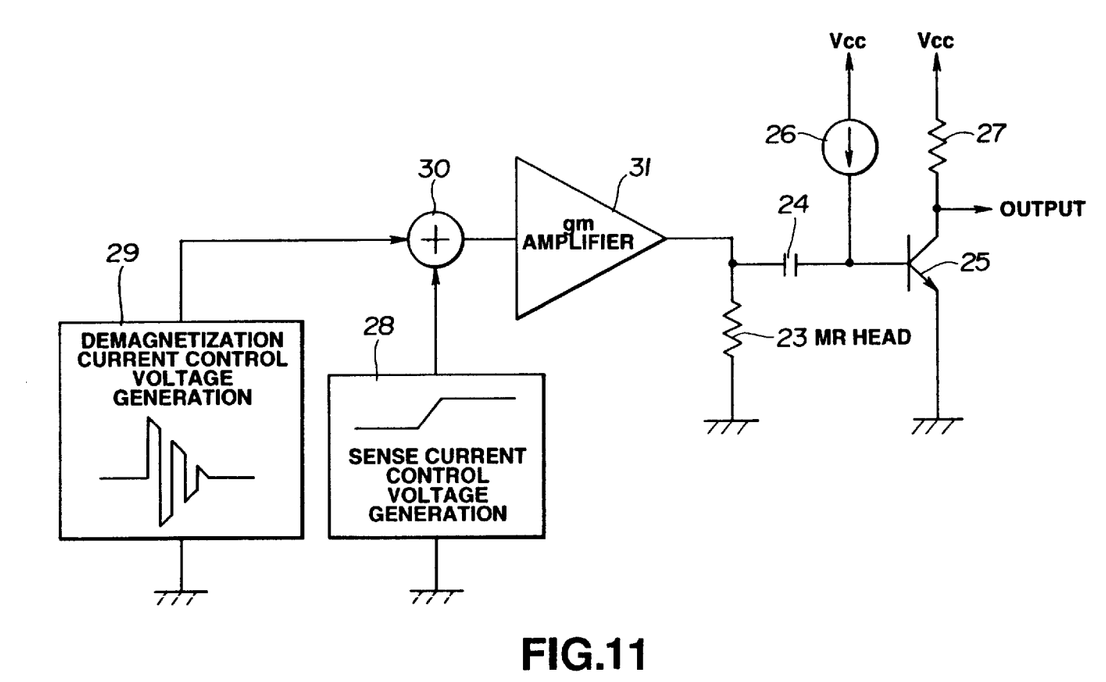
FIG. 11 is a block circuit diagram showing an example of a circuit structure employed in the MR inductive head of Embodiment 3.

Then, an example of the circuit connected to the MR heads of Embodiments 2 and 3 and to the MR inductive head is shown in FIG. 11.

In FIG. 11, an MR head 23 substantially corresponds to the MR element 13. However, while the MR element 13 is electrically connected to the shield core 14, the MR head 23 has its one end grounded and its other end provided with a DC as the sense current, as later described, and has the output of the other end supplied through a DC cutting capacitor 24 to the base of a common emitter transistor 25 as an initial amplifier.

The connecting point of the base of the transistor 25 and the capacitor 24 is connected with a current source 26 for supplying the base current, while the transistor 25 has its collector connected with a load resistor 27. If the value of resistance of the MR head through which the sense current flows is changed by the signal magnetic field, the change is taken out as a change in voltage. The change in voltage is then supplied through the DC cutting capacitor 24 to the common emitter transistor 25, where it is amplified so as to be outputted.

The MR head 23 is supplied with a DC sense current and a decrement AC demagnetization current. That is, an output voltage from a sense current control voltage generation circuit 28 and an output voltage from a demagnetization current control voltage generation circuit 29 are added together by an adder 30 and the resulting voltage is transmitted to a $g_m$ amplifier 31 as a voltage-current converter, where it is converted into a current to be transmitted to the MR head 23.

A concrete example of the sense current and the demagnetization current in this case is shown in FIG. 12. In FIG. 12, as the reproduction/recording (R/W) mode changes as shown in FIG. 12A, the sense current of DC having a current value of $I_s$ is provided in the reproduction (R) mode, as shown in FIG. 12B. A decrement DC having an initial current amplitude value of $\pm I_d$, as shown in FIG. 12C, is superposed on the sense current, thus producing a current as shown in FIG. 12D.

In the example of FIG. 12, the sense current and the demagnetization current are caused to flow simultaneously at timing $t_1$ for switching the operation from the recording (W) mode to the reproduction (R) mode. However, it is also allowable to cause only the demagnetization current to flow on completion of recording, that is, at timing $t_1$, and to cause the sense current to flow at timing $t_3$ when the flow of the demagnetization current is completed, as shown in FIG. 11.

Figure 13:
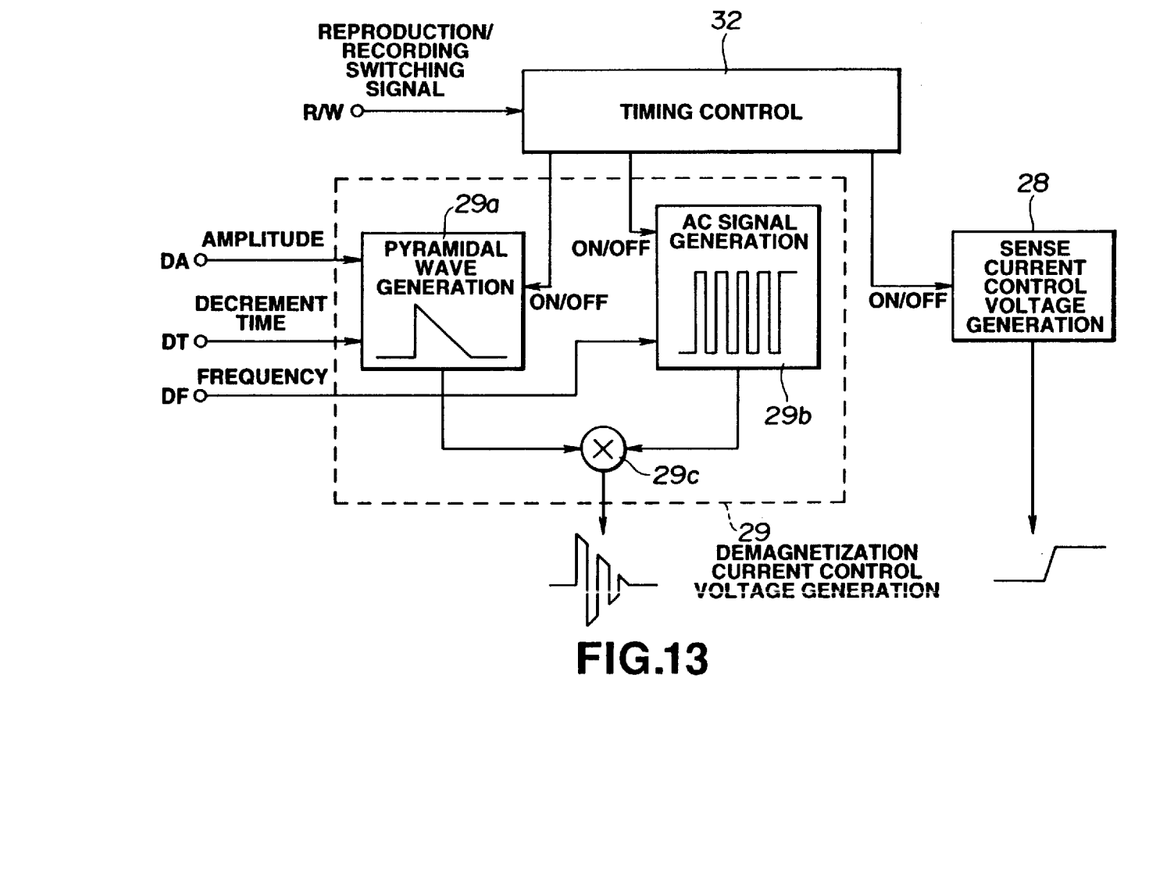
FIG. 13 is block circuit diagram showing a concrete example of a demagnetization current control voltage generation circuit and a sense current control voltage generation circuit of the MR inductive head of Embodiment 3.

Such timing control can be realized using the structure as shown in FIG. 13.

In FIG. 13, the sense current control voltage generation circuit 28 and the demagnetization current control voltage generation circuit 29 are provided with on/off control signals from a timing control circuit 32. The timing control circuit 32 is provided with a reproduction/recording switching control signal R/W. At timing $t_1$ when the switching control signal R/W is changed from recording (W) to reproduction (R), the demagnetization current control voltage generation circuit 29 is turned on to generate a decrement AC voltage. The sense current control voltage generation circuit 28 is turned on at timing $t_1$ (in the case of FIG. 12) or at timing $t_3$ (in the case of FIG. 14) after the amplitude of the demagnetization current reaches 0, thus generating a DC demagnetization current control voltage.

The demagnetization current control voltage generation circuit 29 includes a pyramidal wave generation circuit 29a, an AC signal generation circuit 29b, and a multiplier 29c for multiplying output signals from the circuits 29a, 29b. The pyramidal wave generation circuit 29a is supplied with amplitude data DA for setting the initial current amplitude value $\pm I_d$ of the demagnetization current and decrement time data DT for setting the decrement time of the amplitude, while the AC signal generation circuit 29b is supplied with frequency data DF for setting frequency of the AC.

Figure 12A:
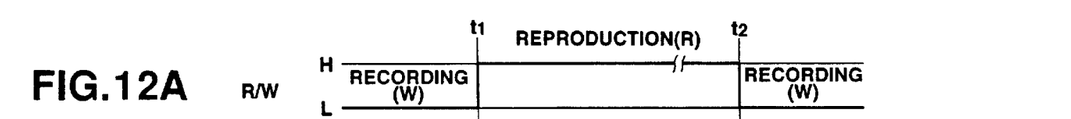
FIG. 12A shows changes in the reproduction/recording (R/W) mode.
Figure 12B:
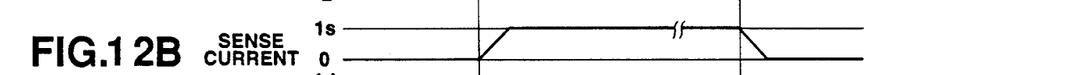
FIG. 12B shows a sense current (DC) in the recording mode.
Figure 12C:
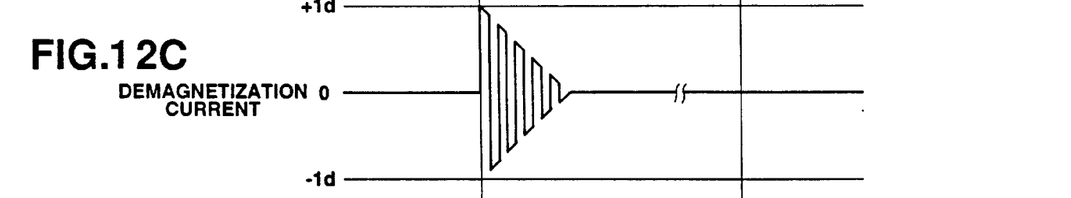
FIG. 12C shows a decrement demagnetization current (AC).

A pyramidal wave voltage of the amplitude and the decrement time based upon the data DA and DT is outputted from the pyramidal wave generation circuit 29a, and an AC of the frequency based upon the data DF is outputted from the AC signal generation circuit 29b. These output signals are multiplied by the multiplier 29c and is outputted as the decrement AC voltage signal as shown in FIG. 12C.

Figure 12D:
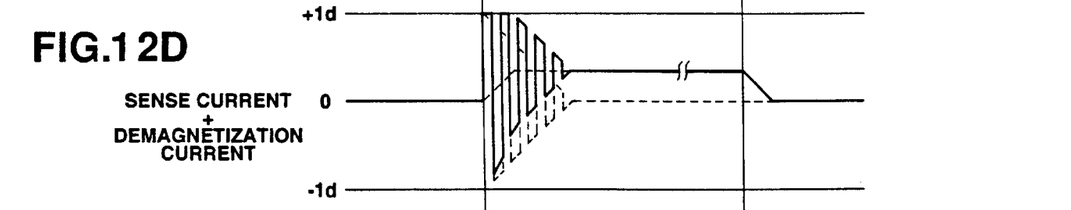
FIG. 12D shows a state in which the demagnetization current has been superposed on the sense current.

The initial amplitude value $\pm I_d$ of the demagnetization current is set as a value sufficiently large for the MR head of FIG. 6 or the MR inductive head of FIG. 9 to perfectly exhibit the structure of single magnetic domain, and this initial amplitude value $\pm I_d$ is changed to a decrement repeat wave, thus converging the magnetic domain of the shield core in a constant stable state. In the case of FIG. 12, if the sense current and the demagnetization current are simply added together, the peak value exceeds $I_d$ or decreases below $-I_d$. However, since the current exceeding $I_d$ is unnecessary, the current may be limited at $I_d$, as shown in FIG. 12D. If $I_d$ is of a value not so large compared with the sense current $I_s$, there is a possibility that the reciprocal balance of the demagnetization current is disturbed, causing ineffective magnetization. In this case, it is effective to stop the flow of the sense current during the flow of the demagnetization current and to allow the sense current to flow when the demagnetization current reaches 0.

Thus, by superposing the demagnetization current of decrement repeat wave decreasing from the current level large enough for the shield core 14 to perfectly exhibit the structure of single magnetic domain at the start of reproduction, onto the sense current for flowing, the turbulent magnetic domain of the shield core 14 on recording can be adjusted to a constant stable state on reproduction. Therefore, the bias magnetic field applied to the MR element 13 and the magnetic path to the signal magnetic field are stabilized, thus stabilizing the reproduction signal, having no Barkhausen noise. Consequently, in the present embodiment, the track recording density which was conventionally restricted by instability of the reproduction signal can now be increased. Also, since the shield core width which was conventionally able to be reduced only to a certain extent because of instability of the magnetic domain can be further reduced now, crosstalk from adjacent tracks taken up through the shield core can be reduced. Thus, the track density can be improved, increasing the storage capacity of the magnetic disk device.

Several examples of the structure of a reproduction circuit employed for the embodiments of the present invention will now be described in detail, with reference to the drawings.

Figure 15:
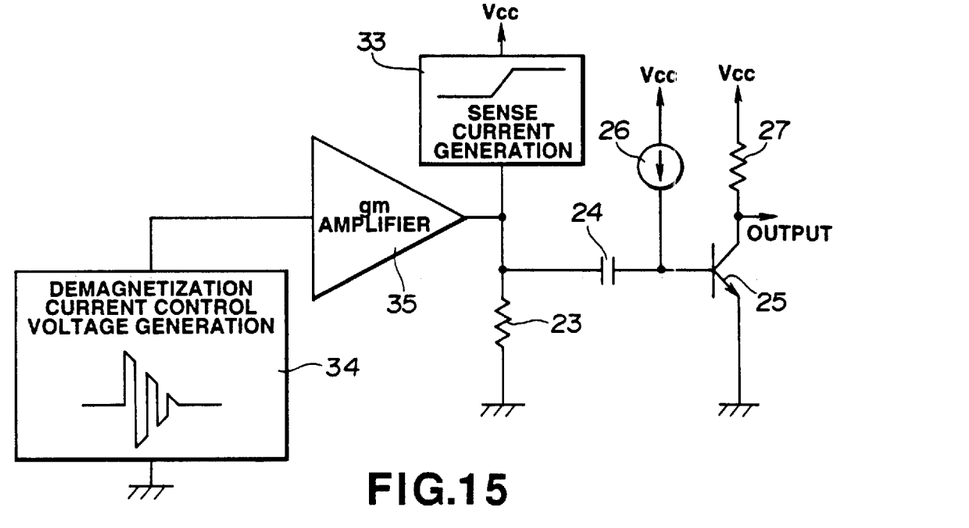
FIG. 15 is a block circuit diagram showing another example of the circuit structure employed in the MR inductive head of Embodiment 3.

An example of the circuit in which a common emitter transistor is used as an initial amplifier of the MR head is shown in FIG. 15. As shown in FIG. 15, the MR head 23 is supplied with a sense current from a sense current generation circuit (current source) 33, and has its terminal voltage transmitted through the capacitor 24 to the base of the common emitter transistor 25. The connecting point of the base of the transistor 25 and the capacitor 24 is connected with the current source 26 for supplying a base current. The transistor 25 has its collector connected with the load resistor 27.

In addition, an output signal from the demagnetization current control voltage generation circuit 34 is provided through a $g_m$ amplifier 35 as a voltage-current converter to the connecting point of the sense current generation circuit 33 and the MR head 23. The demagnetization current control voltage generation circuit 34, similar to the demagnetization current control voltage generation circuit 29 of FIG. 11, generates a decrement AC voltage, which is converted by the $g_m$ amplifier 35 into a current to be supplied to the MR head 23 as the decrement repeat wave current decreasing from the level large enough for the shield core to perfectly exhibit the structure of single magnetic domain at the start of reproduction.

Figure 14:
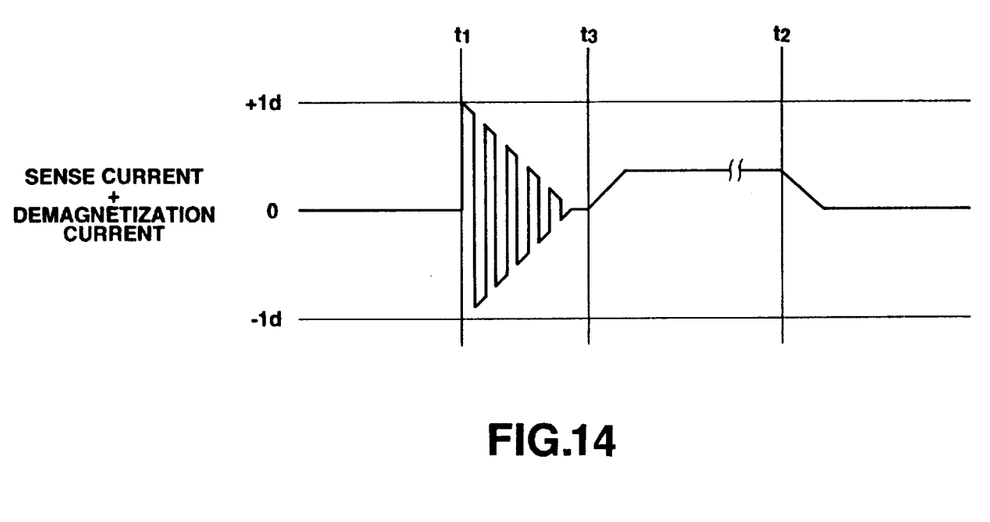
FIG. 14 is a waveform diagram showing another example of the current supplied to the MR head of the MR inductive head of Embodiment 3.

Thus, two current sources are employed, that is, the sense current generation circuit 33 supplying the sense current and the demagnetization current control voltage generation circuit 34 supplying the voltage output signal to be converted by the $g_m$ amplifier 35 into the current as the demagnetization current to be supplied. In the embodiment shown in FIG. 15, the timing setting for the demagnetization current and the sense current as explained with reference to FIGS. 12 and 14 can be implemented, with a method of starting the flow of the demagnetization current and the sense current simultaneously at the start of reproduction, as shown in FIG. 12 or with a method of starting the flow of the sense current on completion of the flow of the demagnetization current, as shown in FIG. 14.

That is, in the case where the demagnetization current and the sense current start to flow simultaneously immediately after completion of recording at timing $t_1$, as shown in FIG. 12, the reduction in switching time for switching of the reproduction mode to the actually reproducible state is advantageous. In this case, however, it may be better to cause the sense current to flow after completion of the flow of the demagnetization current having the initial amplitude value of $\pm I_d$, as shown in FIG. 14, depending upon conditions demanded of the demagnetization current in terms of magnetization effects.

Figure 16:
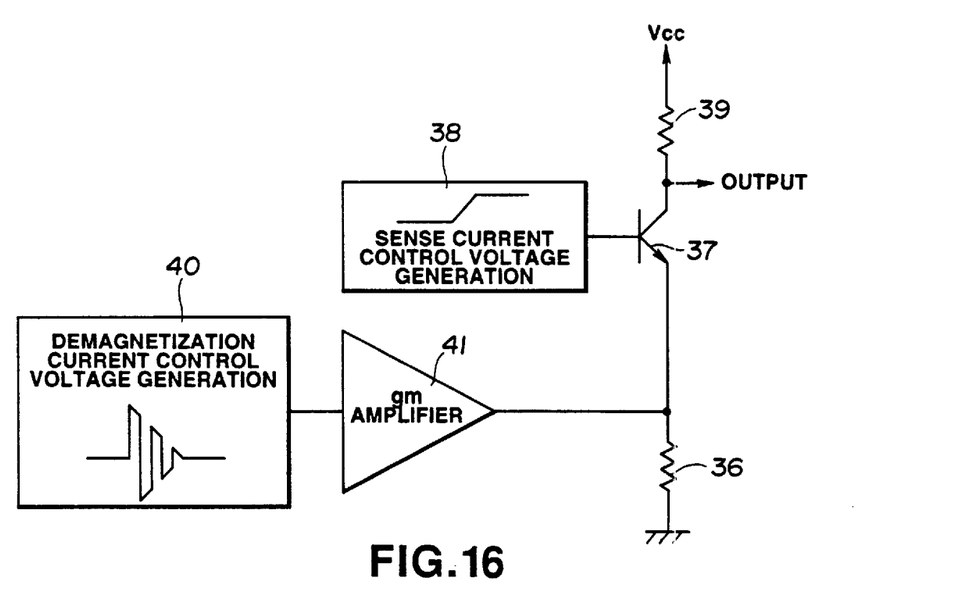
FIG. 16 is a block circuit diagram showing still another example of the circuit structure employed in the MR inductive head of Embodiment 3.

FIG. 16 shows an example in which a common base transistor 37 is employed as an initial amplifier for taking out signals from the MR head 36. In FIG. 16, the transistor 37 has its emitter grounded via the above-described MR head. Also, the transistor 37 has its base supplied with a sense current control voltage signal from a sense current control voltage generation circuit 38, and has its collector connected with a $V_{CC}$ source through a load resistor 39.

In addition, a decrement AC voltage output signal from a demagnetization current control voltage generation circuit 40 is converted by a $g_m$ amplifier 41 as a voltage-current converter into a current signal to be supplied between the transistor 37 and the MR head 36. A voltage source, for example, can be used for the sense current control voltage generation circuit 38. The sense current is determined by the voltage of the voltage source, an emitter voltage determined by the transistor 37, and the resistance value of the MR head 36.

The example shown in FIG. 16 can be considered to include two current sources, that is, the current source obtained by directly applying the output voltage from the sense current control voltage generation circuit 38 to the base of the transistor 37, and the current source obtained by the $g_m$ amplifier 41. It is a matter of course that, in the embodiment of FIG. 16, the method of starting the flow of the demagnetization current and the sense current simultaneously at the start of reproduction, as shown in FIG. 12 and the method of starting the flow of the sense current on completion of the flow of the demagnetization current, as shown in FIG. 14, can be employed.

In this case, the initial current amplitude value $\pm I_d$ of the demagnetization current is set at a value large enough for the shield core of an MR head, as later described, to perfectly exhibit the structure of single magnetic domain. Thus, by causing the demagnetization current of decrement repeat wave decreasing from the initial amplitude value $\pm I_d$ to flow through the shield core, it is possible to perfectly adjust the magnetic domain which has become turbulent on recording.

Embodiment 4

In Embodiment 4, the present invention is applied to an MR inductive head in which recording/reproduction is carried out with a pair of magnetic films.

Figure 17:
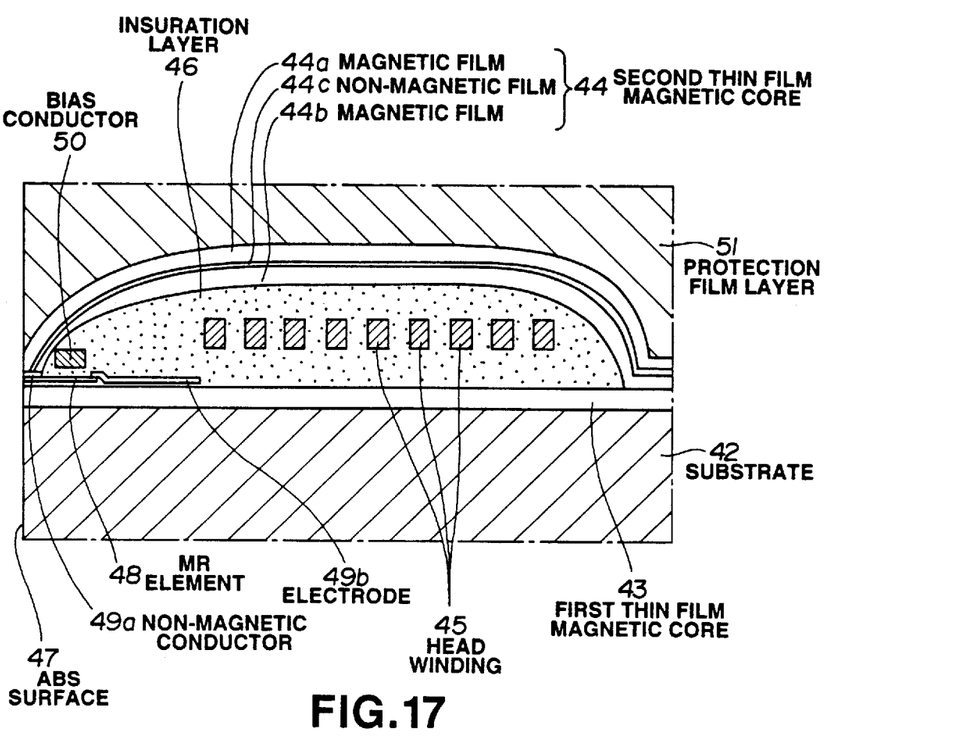
FIG. 17 is an enlarged cross-sectional view showing essential portions of an MR inductive head of Embodiment 4.

The MR inductive head of the present embodiment has a pair of first and second thin-film magnetic cores 43, 44 stacked on a substrate 42, which are used both as recording magnetic cores in recording and as reproduction magnetic cores in reproduction, as shown in FIG. 17.

The first thin-film magnetic core 43 has its one end exposed to an ABS surface 47 as the surface facing the magnetic recording medium, and extends backward in a direction perpendicular to the ABS surface 47.

On the other hand, the second thin-film magnetic core 44 has a stacked structure in which two soft magnetic thin-films 44a, 44b are stacked with a non-magnetic thin film 44c between them. Similar to the first thin-film magnetic core 43, the second thin-film magnetic core 44 has its one end exposed to the ABS surface 47 and extends backward in the direction perpendicular to the ABS surface 47.

Also, the second thin-film magnetic core 44 has its distance from the first thin-film magnetic core 43 narrowed at the front end on the side of the ABS surface 47, and has its distance from the first thin-film magnetic core 43 widened at the central portion provided with a head winding 45. The second thin-film magnetic core 44 is then magnetically connected to the first thin-film magnetic core 43 on the rear side.

Between the first and second thin-film magnetic cores 43, 44, the spiral head winding 45 is buried in an insulation layer 46 in such a manner as to surround the magnetically connecting portion of the thin-film magnetic cores 43, 44.

Also, between the first and second thin-film magnetic cores 43, 44, an MR element 48 is provided at a portion close to the ABS surface 47 as the surface facing the magnetic recording medium. The MR element 48 has its longitudinal direction perpendicular to the ABS surface 47, and has one end exposed to the ABS surface 47.

At the front end of the MR element 48, a non-magnetic conductor 49a is stacked, serving both as an electrode and as a gap film. The non-magnetic conductor 49a is electrically connected to the second thin-film magnetic core 44. The rear end of the MR element 48 is electrically connected with an electrode 49b for causing a sense current to flow through the MR element 48 so as to be taken out.

Between the non-magnetic conductor 49a and the electrode 49b, a bias conductor 50 for providing a bias magnetic field in a predetermined direction to the MR element 48 is provided. The bias conductor 50 is provided in the direction substantially orthogonal to the longitudinal direction of the MR element 48, that is, in the vertical direction in FIG. 17, traversing the MR element 48. Both ends of the bias conductor 50 carry a bias current from a DC power source. Consequently, the DCs provided from both terminals flow in the direction of track width, and a resulting bias magnetic field is applied in the longitudinal direction of the MR element 48.

In the MR inductive head as described above, the inductive head is constituted by the first and second thin-film magnetic cores 43, 44 and the head winding 45, while the shield MR head is constituted by the MR element 48 provided with the non-magnetic conductor 49a and the electrode 49b on the front and rear sides thereof, respectively, and the first and second thin-film magnetic cores 43, 44 sandwiching the bias conductor 50 from above and below.

Figure 18:
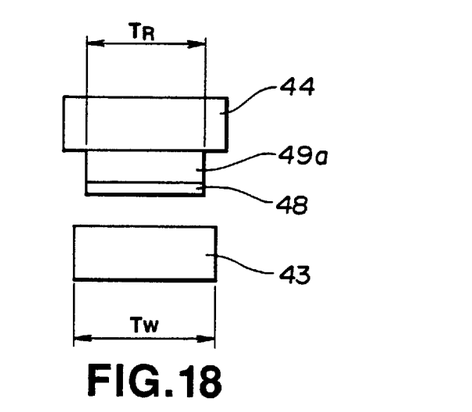
FIG. 18 is an enlarged front view showing essential portions of the MR inductive head of Embodiment 4, as viewed from the ABS surface.

A protection film layer 51 for protecting the MR inductive head is formed on the second thin-film magnetic core 44. The reproduction track width $T_R$ and the recording track width $T_W$ in the MR inductive head are in the relation as shown in FIG. 18.

In this MR inductive head, since recording and reproduction are carried out with the second thin-film magnetic core 44 as a common magnetic body, residual magnetization remains after recording, causing the magnetic domain to be turbulent. However, since the sense current flows through the second thin-film magnetic core 44 in the direction of hard axis via the MR element 48, the magnetic field generated by the sense current stabilizes the magnetic domain. Thus, even when the mode is switched from recording to reproduction, the stable magnetic domain serves to prevent fluctuation in output and generation of the Barkhausen noise.

It is to be understood that the present invention is not limited to the above-described embodiments. For example, though the bias magnetic field generated by the bias current flowing through the bias conductor is used as the bias to be applied to the MR element, the bias magnetic field may be applied with a polarized hard magnetic body thin-film provided instead of the bias conductor. The present invention can also apply to an MR head which does not require a bias conductor, such as, a so-called shunt bias conductor. In addition, though the shield MR head is explained in the embodiment, the present invention can also apply to a yoke MR head, replacing the shield core in the embodiment.

As is clear from the above description, in the thin-film magnetic head of the present invention, one of the thin-film magnetic cores is formed of two layers of magnetic films stacked with a non-magnetic film between them, and the current flows through the thin-film magnetic core in the direction of hard axis thereof. Thus, the turbulent magnetic domain after recording can be adjusted by the magnetic field generated by the current flowing through the thin-film magnetic core, producing the stable magnetic domain.

Also, in the MR head of the present invention, the MR element is electrically connected with one of a pair of shield cores having the MR element between them, and the shield core is formed of two magnetic films and a non-magnetic film held between them. Thus, the sense current flowing through the MR element can also flow through the shield core in the direction of hard axis thereof, demagnetizing the shield core.

Accordingly, even if the magnetic domain of the shield core becomes turbulent on recording, it can be adjusted into a constant stable state on reproduction. Therefore, since the bias magnetic field applied to the MR element and the magnetic path to the signal magnetic field are stabilized, generation of the Barkhausen noise can be prevented and reproduction signals can be stabilized, thus improving the track recording density which was conventionally limited by instability of the reproduction signals. Also, since the width of the shield core which was conventionally able to be reduced only to a certain extent because of instability of the magnetic domain can be further reduced, crosstalk from adjacent tracks taken up through the shield core can be reduced, and track density can be increased. Thus, the storage capacity of the magnetic disk device can be enlarged.

In addition, in the MR inductive head of the present invention, a current flows through the second thin-film magnetic core as the common magnetic body of the MR head and the inductive head in the direction of hard axis of the second thin-film magnetic core. Therefore, the turbulent magnetic domain after recording can be adjusted by the magnetic field generated by the current flowing through the thin-film magnetic core, producing a stable magnetic domain. Accordingly, the turbulent structure of magnetic domain of the shield core after recording with the inductive head can be stabilized by the magnetic field generated by the current flowing through the second thin-film magnetic core, thus significantly reducing fluctuation in output and generation of the Barkhausen noise.

What is claimed is:

1. A thin film magnetic head system, comprising:
    a) a thin film magnetic head formed on a substrate comprising:
        a magnetoresistive element,
        a pair of shield cores holding the magnetoresistive element between them at a forward end of the head,
        a non-magnetic conductor electrically connecting the magnetoresistive element to one of the shield cores to conduct a current in series through said magnetoresistive element and said one shield core, which current is effective to generate a magnetic field in the direction of an easy axis of said one shield core thereby to stabilize the magnetic domain of the said one shield core,
        said one shield core being formed of two magnetic films and a non-magnetic film held between the magnetic films, and
        the other shield core being positioned closer to said substrate than said one shield core;
    b) a sense signal source which provides a sense signal;
    c) a demagnetizing signal source which provides a demagnetization signal;
    d) means for adding together the sense and demagnetization signals; and
    e) means for generating said current from said added signals.

2. The thin film magnetic head system as claimed in claim 1, wherein a current is caused to flow through said one shield core in a direction of hard axis thereof via the magnetoresistive element.

* * * * *